United States Patent
Zhang et al.

(10) Patent No.: US 9,530,026 B2
(45) Date of Patent: Dec. 27, 2016

(54) PRIVACY PROTECTION FOR PARTICIPATORY SENSING SYSTEM

(75) Inventors: Junsong Zhang, Beijing (CN); Jian Ma, Beijing (CN); Xiong Li, Beijing (CN); Yazhi Liu, Beijing (CN); Ye Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 43 days.

(21) Appl. No.: 14/398,183

(22) PCT Filed: Jun. 8, 2012

(86) PCT No.: PCT/CN2012/076645
§ 371 (c)(1),
(2), (4) Date: Oct. 31, 2014

(87) PCT Pub. No.: WO2013/181841
PCT Pub. Date: Dec. 12, 2013

(65) Prior Publication Data
US 2015/0128282 A1    May 7, 2015

(51) Int. Cl.
*H04L 9/32* (2006.01)
*G06F 21/62* (2013.01)
*H04L 29/06* (2006.01)

(52) U.S. Cl.
CPC ......... *G06F 21/6254* (2013.01); *H04L 9/3268* (2013.01); *H04L 63/0414* (2013.01); *H04L 63/0823* (2013.01); *H04L 2209/42* (2013.01)

(58) Field of Classification Search
CPC .................................................. H04L 2209/42
See application file for complete search history.

(56) References Cited

U.S. PATENT DOCUMENTS

| 2001/0049620 A1 | 12/2001 | Blasko |
| 2004/0015714 A1 | 1/2004 | Abraham et al. |

(Continued)

FOREIGN PATENT DOCUMENTS

| CN | 101834861 | 9/2010 |
| CN | 101959183 | 1/2011 |

(Continued)

OTHER PUBLICATIONS

Extended European Search Report received for corresponding European Patent Application No. 12878615.9, dated Jan. 15, 2016, 8 pages.

(Continued)

*Primary Examiner* — Josnel Jeudy
(74) *Attorney, Agent, or Firm* — Mintz Levin Cohn Ferris Glovsky and Popeo, P.C.

(57) ABSTRACT

Provided is a method that may be used for privacy protection. The method comprises: generating a pseudonym at a user equipment in association with sensed data; calculating a unique value based upon the pseudonym using a first algorithm; sending the unique value and the sensed data to a server; receiving from the server a certificate, wherein the certificate is calculated based at least in part on the unique value using a second algorithm; and sending at least the pseudonym and the certificate to a certification center via a secure channel, for obtaining a reward associated with the sensed data; wherein the certification center is internal or external to the server. By this method, a user's identify may be protected.

16 Claims, 8 Drawing Sheets

(56) References Cited

U.S. PATENT DOCUMENTS

| | | |
|---|---|---|
| 2007/0043583 A1 | 2/2007 | Davulcu et al. |
| 2007/0129966 A1 | 6/2007 | Walker et al. |
| 2007/0143608 A1 | 6/2007 | Zeng et al. |
| 2008/0209575 A1 | 8/2008 | Conrado et al. |
| 2009/0254971 A1* | 10/2009 | Herz ................ G06Q 10/10 726/1 |
| 2009/0300715 A1 | 12/2009 | Ahn |
| 2010/0257036 A1 | 10/2010 | Khojastepour et al. |
| 2011/0161147 A1 | 6/2011 | Gannon et al. |
| 2011/0307691 A1 | 12/2011 | Riguidel et al. |

FOREIGN PATENT DOCUMENTS

| | | |
|---|---|---|
| CN | 101998377 | 3/2011 |
| WO | 02/49311 A2 | 6/2002 |

OTHER PUBLICATIONS

Camenisch et al., "Pseudonyms And Private Credentials", Digital privacy, Lecture Notes in Computer Science, vol. 6545, 2011, pp. 289-308.

Gilbert et al., "YouProve: Authenticity and Fidelity in Mobile Sensing", Proceedings of the 9th ACM Conference on Embedded Networked Sensor Systems, Nov. 1-4, 2011, pp. 176-189.

International Search Report and Written Opinion received for corresponding Patent Cooperation Treaty Application No. PCT/CN2012/076645, dated Mar. 14, 2013, 11 pages.

Huang et al., "Preserving Privacy in Participatory Sensing Systems", Computer Communications, vol. 33, Issue 11, Jul. 2010, pp. 1266-1280.

Yang et al., "Privacy-Preserving Communication and Precise Reward Architecture for V2G Networks in Smart Grid", IEEE Transactions on Smart Grid, vol. 2, No. 4, Dec. 2011, pp. 697-706.

Petrlic., "A Privacy-Preserving Concept For Smart Grids", Workshop Sicherheit in vernetzten Systemen, vol. 18, 2010, pp. 1-14.

Androulaki, "A Privacy Preserving ECommerce Oriented Identity Management Architecture", Thesis, May, 2011, 285 Pages.

Huang et al., "PACP: An Efficient Pseudonymous Authentication-Based Conditional Privacy Protocol for VANETs", IEEE Transactions on Intelligent Transportation Systems, vol. 12, No. 3, Sep. 2011, pp. 736-746.

Yang et al., "A Smart-Card-Enabled Privacy Preserving E-Prescription System", IEEE Transactions on Information Technology in Biomedicine, vol. 8, No. 1, Mar. 2004, pp. 47-58.

\* cited by examiner

PRIVACY PROTECTION FOR PARTICIPATORY SENSING SYSTEM

RELATED APPLICATION

This application was originally filed as PCT Application No. PCT/CN2012/076645 filed Jun. 8, 2012.

FIELD OF THE INVENTION

Example and non-limiting embodiments of this invention relate generally to a communication network and particularly to a privacy protection technology that may be used for participatory sensing systems in the communication networks.

BACKGROUND OF THE INVENTION

Mobile phones of today have evolved from merely being phones to full-fledged computing, sensing, and communication devices. These features of mobile phones coupled with their ubiquity have paved a way for an exciting new paradigm for accomplishing large-scale sensing, i.e. participatory sensing. Participatory sensing is a concept of communities (or other groups of people) contributing sensory information to form a body of knowledge. One key idea of participatory sensing is to empower ordinary persons to collect and share sensed data from surrounding environments using their mobile devices. For example, cameras on mobile phones can be used as video and/or image sensors; embedded Global Positioning System (GPS) receivers on mobile phones can provide location information.

SUMMARY OF THE INVENTION

Example embodiments of the present invention propose an anonymous dynamic identity (ID) privacy protection method for participatory sensing with incentives. In this method, a pseudonym is used to represent a user. When a user wants to provide sensed data to a server, the user may generate a pseudonym and use the pseudonym as his or her identity. Consequently, the server and/or an adversary will not be able to track the user since the user's identity information is hidden in the whole process of communication.

An aspect of the invention relates to a method. The method comprises: generating a pseudonym, at a user equipment, in association with sensed data; calculating a unique value based upon the pseudonym using a first algorithm; sending the unique value and the sensed data to a server; receiving a certificate from the server, wherein the certificate is calculated based at least in part on the unique value using a second algorithm; and sending at least the pseudonym and the certificate to a certification center via a secure channel, for obtaining a reward associated with the sensed data, wherein the certification center is internal or external to the server.

A second aspect of the invention relates to another method. The method comprises: receiving, at a server, a unique value and sensed data from a user equipment, wherein the unique value is calculated at the user equipment using a first algorithm based upon a pseudonym generated by the user equipment; calculating a certificate based at least in part on the unique value using a second algorithm; and sending the certificate to the user equipment so that the certificate may be forwarded to a certification center for obtaining a reward associated with the sensed data, wherein the certification center is internal or external to the server.

A third aspect of the invention also relates to a method. The method comprises: receiving, at a certification center, at least a pseudonym and a certificate via a secure channel from a user equipment; calculating a unique value using a first algorithm based upon the pseudonym; calculating at least one reference value based at least in part on the unique value using a second algorithm; comparing the at least one reference value with the received certificate; and if the at least one reference value matches the received certificate, confirming validity of the received certificate so that the user equipment may obtain a reward associated with sensed data; wherein the certification center is internal or external to a server.

A fourth aspect of the invention relates to an apparatus. The apparatus comprises: a sensor arrangement comprising at least one sensor for sensing data; at least one processor; and at least one memory including a computer program code, wherein the at least one memory and the computer program code are configured to, with the at least one processor, cause the apparatus to: generate a pseudonym in association with sensed data; calculate a unique value based upon the pseudonym using a first algorithm; send the unique value and the sensed data to a server; receive from the server a certificate, wherein the certificate is calculated at the server based at least in part on the unique value using a second algorithm; and send at least the pseudonym and the certificate to a certification center via a secure channel, for obtaining a reward associated with the sensed data, wherein the certification center is internal or external to the server.

A fifth aspect of the invention relates to another apparatus. The apparatus comprises: at least one processor; and at least one memory including a computer program code, wherein the at least one memory and the computer program code are configured to, with the at least one processor, cause the apparatus to: receive a unique value and sensed data from a user equipment, wherein the unique value is calculated at the user equipment using a first algorithm based upon a pseudonym generated by the user equipment; calculate a certificate based at least in part on the unique value using a second algorithm; and send the certificate to the user equipment so that the certificate may be forwarded to a certification center for obtaining a reward associated with the sensed data, wherein the certification center is internal or external to the apparatus.

A sixth aspect of the invention also relates to an apparatus. The apparatus comprises: at least one processor; and at least one memory including a computer program code, wherein the at least one memory and the computer program code are configured to, with the at least one processor, cause the apparatus to: receive at least a pseudonym and a certificate via a secure channel from a user equipment; calculate a unique value using a first algorithm based upon the pseudonym; calculate at least one reference value based at least in part on the unique value using a second algorithm; compare the at least one reference value with the received certificate; and if the at least one reference value matches the received certificate, confirm validity of the received certificate so that the user equipment may obtain a reward associated with sensed data; wherein the apparatus is internal or external to a server.

A seventh aspect of the invention relates to a method, wherein an encryption function is used to calculate a certificate which is used for obtaining a reward by a user.

Further, the proposed method uses a one-way hash function to convert the user's pseudonym into a unique value.

The value transmitted between the user and the server is the unique value and the one-way hash function is irreversible, so the adversary is not possible to obtain the user's pseudonym.

The proposed method also uses a certificate-pseudonym pair to verify validity of the certificate. This can ensure effective implementation of the incentive mechanism.

BRIEF DESCRIPTION OF DRAWINGS

The invention itself, the preferable mode of use and further objectives are best understood by reference to the following detailed description of the embodiments when read in conjunction with the accompanying drawings, in which.

DETAILED DESCRIPTION OF EMBODIMENTS

A typical participatory sensing application operates in a centralized way, i.e., sensed data collected by volunteers' mobile phones/devices are reported (for example, using wireless data communications) to a server or a mobile phone/device acting as a server for processing. The sensing tasks on the phones can be triggered manually, automatically, or based on context. On the server side, the sensed data may be analyzed and presented in various forms, such as graphical representations or maps showing the sensing results in an individual and/or community scale. Simultaneously, the results may be displayed locally on a user's mobile phone or accessed by the public according to different application scenarios.

The participatory sensing technology has the following characteristics:
  Low cost of deployment due to the usage of existing sensors (for example mobile phones) and communication (cellular or WiFi) infrastructure to collect and transmit data.
  The inherent mobility of mobile terminal results in unprecedented spatial and temporal coverage.
  Low degree of difficulty of service development which facilitates large-scale deployment.
  The user may be not only a customer of the participatory sensing system but also a service provider and/or an ultimate beneficiary.

Participatory sensing can be used to retrieve information about the environment, weather, traffic as well as any other sensory information that collectively forms knowledge.

In order to maintain user's enthusiasm to participate in a participatory sensing application, some sort of reward or payment mechanisms may be established to motivate the user to actively participate in the application. To reward the participated user, the user's information, for example, the user's identity information is needed.

On the other hand, when a user provides his/her sensed data, he/she may not want to leak his/her private information (for example, identity information).

A challenge is how to protect the privacy of a user and meanwhile meet the demand for rewarding the user when the user is involved in a participatory sensing system.

Some embodiments will be described in more detail with reference to the accompanying drawings, in which certain embodiments of the present invention have been illustrated. However, the present invention can be implemented in various manners, and thus should not be construed to be limited to the embodiments disclosed herein. On the contrary, those embodiments are provided for the thorough and understanding of the present invention, and completely conveying the scope of the present invention to those skilled in the art.

It is understood in advance that although this disclosure includes a detailed description on a participatory sensing system, implementation of the teachings recited herein are not limited to a participatory sensing system. Rather, embodiments of the present invention are capable of being implemented in conjunction with any other type of system requiring privacy protection and incentive mechanisms now known or later developed.

Figure 1:
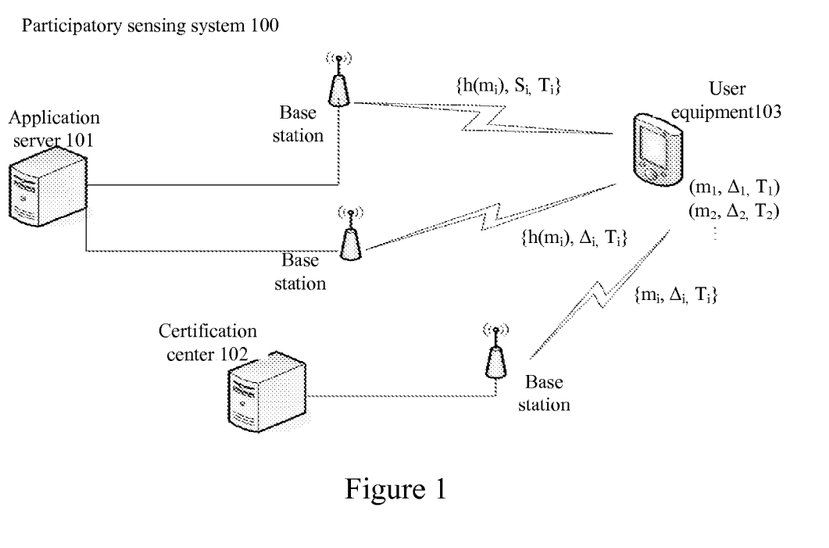
FIG. 1 illustrates a schematic architecture of a participatory sensing system according to an example embodiment of the present invention.

FIG. 1 illustrates a schematic architecture of a participatory sensing system 100 according to an example embodiment of the present invention. The participatory sensing system 100 comprises a server, such as an application server 101, a certification center (CC) 102, and a user equipment (UE) 103. The application server 101 may also be a user equipment that acts as a server and runs server application(s). For simplicity, only one UE 103 is shown in FIG. 1, however, more than one UE can be used in the participatory sensing system. The UE 103 may also be referred to as a user terminal, which comprises a wireless mobile communication device including, but not limited to, a mobile phone, a smart phone, a personal digital assistant (PDA), a handset, and a laptop computer. The UE 103 may be provided with one or more sensors and is capable of sensing the surrounding environment and collecting sensed data $S_i$. The UE 103 can randomly generate a pseudonym $m_i$ and convert it into a value $h(m_i)$ via a one-way hash function $h(\cdot)$ when the user wishes or is required to send the sensed data to the application server 101.

The application server 101 is capable of designing/selecting a suitable one-way hash function $h(\cdot)$ and distributing it to all users. Or the one-way hash function $h(\cdot)$ may be pre-loaded and agreed between the application server 101 and the UE 103. In one embodiment, the hash function or a similar function is referred to as a first algorithm. The one-way hash function may be, for example, but not limited to, MD5 (Message Digest Algorithm 5) or SHA-1 (Secure Hash Algorithm-1) etc. MD5 is a one-way hash algorithm developed by RSA Data Security Inc., in which the input can be a character string with any length and the output is always 128-bit encoded data. SHA-1 is a cryptographic hash function designed by the United States National Security Agency and published by the United States NIST as a U.S. Federal Information Processing Standard. SHA-1 can also accept any length of input, and output 160-bit encoded data. SHA-1 is irreversible and has a good avalanche effect (when the input is changed slightly, for example, flipping a single bit, the output changes significantly, for example, half the output bits flip) to avoid collision. The application server 101 may also design an encryption function $f_k(\bullet)$, which is used to generate a corresponding certificate for the user. In one embodiment, the encryption function or a similar function is referred to as a second algorithm. The encryption function $f_k(\bullet)$ can be chosen from common symmetric encryption functions, such as AES (Advanced Encryption Standard), Triple DES (Triple Data Encryption Standard) etc. The input of encryption function $f_k(\bullet)$ can be a long character string obtained by concatenating a key k and other parameters. Alternatively, public-key cryptography algorithms can also be used, such as RSA or ECC (Elliptic Curve Cryptography), in which the corresponding character string may be mapped into a certain integer (one-to-one mapping) as the input to the algorithm. The application server 101 may further define a data format which is required by the user to send a message comprising the sensed data and the value $h(m_i)$. The application server 101 may also define a set of grades for the sensed data and assign the number of the grades according to requirements.

The certification center (CC) 102 may be internal or external to the application server 101 and functions as a verification agency. In one embodiment, the certification center 102 is independent of the application server 101, and the application server 101 may trust the certification center 102 completely in this situation. In another embodiment, the CC 102 is incorporated into the application server 101. The CC 102 is aware of the application server's master key k, the encryption function $f_k(\bullet)$ (i.e., a type of the second algorithm) and the one-way hash function $h(\bullet)$ (i.e., a type of the first algorithm) designed/selected by the application server 101. The certification center 102 can communicate with the user equipment 103 via a secure channel. In one embodiment, the application server 101 sends information associated with the first algorithm and information associated with the second algorithm to the CC 102 so that the CC 102 may perform the first algorithm and the second algorithm when necessary. The information associated with the first algorithm may comprise information for identifying or designating the first algorithm and/or one or more parameters of the first algorithm. The information associated with the second algorithm may comprise information for identifying or designating the second algorithm and/or one or more parameters of the second algorithm.

The proposed method according to an example embodiment of the present invention may generally contain, for example, five phases, i.e. system initialization phase, data collection and uploading phase, data processing phase, certificate obtaining phase and reward obtaining phase.

System Initialization Phase

In this phase, the application server 101 designs or selects a suitable one-way hash function h(and distributes/notifies it to all users. The application server 101 may also define the data format which is required when the user sends a message to the application server 101. The application server 101 may further define a set of grades for the sensed data based on, for example, quality, types or amount of the data, and may set the number of the grades according to application requirements. For example, the number of the grades can be set to R and a set of grades, i.e. $G_x \in \{G_1, G_2, \ldots, G_R\}$ is obtained. The quality of data may refer to data accuracy. As an example, in a case where several participants provide the data on temperature, if the temperature provided by a new participant is close to the existing others, the quality of the data provided by the new participant is good and thus a higher grade may be assigned to the data. In contrast, if the temperature provided by the new participant is in a big difference from the existing others, the quality of the data provided by the new participant may be not good and thus a lower grade may be assigned to the data. The types of data mainly refer to value of the different types of data which a participant is capable of collecting. For example, if users' smart phones have temperature sensors, the application server 101 may obtain temperature data from the users. However, maybe only a small amount of the smart phones have humidity sensors, and accordingly the grade assigned to humidity data may be higher than the grade assigned to the temperature data. In another example, if a smart phone can upload PM 2.5 (Particulate Matter 2.5) data that other smart phones could not provide, the corresponding grade assigned to the data may be even higher. Thus, the parameter $G_x$ can be flexibly defined according to particular applications.

In addition, the application server 101 designs or selects an encryption function $f_k(h(m_i), T_i, G_i)$ which may be used to generate a certificate for a user, where k is the server's master key, $m_i$ is user's pseudonym, $T_i$ is a timestamp corresponding to the $m_i$ and $G_i$ is the grade of the sensed data.

Data Collection and Uploading Phase

The user operates the UE 103 to launch a participation sensor program embedded in the UE 103 in accordance with requirements of the system. Then, the UE 103 generates corresponding sensed data $S_i$. The sensed data $S_i$ mainly refers to the content related to the data sensed by the UE 103, which may comprise a data type and a particular value, or an approximate area in which the data is collected (in order to protect user's privacy, maybe only an area conforming to certain accuracy instead of an exact position of the user is provided). Then, if the user wishes or is required to send the sensed data $S_i$, the UE 103 randomly generates a pseudonym $m_i$. At this point, the UE 103 has already obtained or has pre-loaded an agreed one-way hash function $h(\bullet)$ from the application server 101, and thus it can convert the pseudonym $m_i$ using the hash function $h(\bullet)$ and generate a unique value, i.e., a hash conversion value $h(m_i)$. The UE 103 then generates a message $\{h(m_i), S_i, T_i\}$, which includes the hash conversion value $h(m_i)$ of the pseudonym $m_i$, the sensed data $S_i$ and a timestamp $T_i$ when the data was collected, and then sends this message to the application server 101 in the data format defined by the application server 101 via a common channel.

Data Processing Phase

Upon receiving the message $\{h(m_i), S_i, T_i\}$ from the UE 103, the application server 101 processes the relevant sensed data $S_i$ and determines the grade of the sensed data $S_i$. Next, according to the grade of the sensed data $S_i$, the application server 101 calculates a signature $\Delta_i$ based on the user's pseudonym, for example, through equation (1) as follows:

$$\Delta_i = f_k(h(m_i), T_i, G_i) \tag{1}$$

where k is the server's master key, $G_i$ is the grade of the sensed data and $T_i$ is the timestamp. In one embodiment, the signature is also referred to as a certificate, by which the user equipment may obtain, for example, from the application server 101, or from the CC 102, a reward associated with the sensed data $S_i$. In one embodiment, the certificate is calculated by the application server 101 based upon the above-described unique value $h(m_i)$ using a second algorithm. In another embodiment, the certificate is calculated by the application server 101 based upon the unique value $h(m_i)$ and a grade of the sensed data using a second algorithm. In a further embodiment, the certificate is calculated by the application server 101 based upon the unique value $h(m_i)$, a grade of the sensed data, and a timestamp associated with the sensed data using a second algorithm. Once the signature is calculated, the application server 101 generates a message $\{h(m_i),\Delta_i,T_i\}$, which comprises the hash conversion value $h(m_i)$, the signature $\Delta_i$ and the timestamp $T_i$, and then sends it to the UE 103 via a common channel.

Certificate Obtaining Phase

Upon receiving the message $\{h(m_i),\Delta_i,T_i\}$, the UE 103 extracts the signature $\Delta_i$ and stores it in association with the pseudonym $m_i$ and time stamp $T_i$ into the UE 103. The UE 103 may store a series of certificate-pseudonym pairs in the format of $\{m_i,\Delta_i,T_i\}$.

Reward Obtaining Phase

The certification center 102 has knowledge of the application server's master key k and the encryption function $f_k(\bullet)$ as well as the one-way hash function $h(\bullet)$ designed/selected by the application server 101. The certification center 102 may also have knowledge of the set of grades of the sensed data. Thus, when the user wants to exchange the certificate for a reward, he/she may send a message $\{m_i,\Delta_i,T_i\}$, which may comprise the user's pseudonym $m_i$, the signature $\Delta_i$ obtained from the application server 101 and the timestamp $T_i$, to the certification center 102 via a secure channel. After receiving the message, the certification center 102 calculates $\Delta_{ix}^*=f_k(h(m_i),T_i,G_x)$ using each $(G_x\in\{G_1, G_2, \ldots, G_R\}$. Next, the certification center 102 compares $\Delta_{ix}^*$ with $\Delta_i$ so as to determine whether the user with the message $\{m_i,\Delta_i,T_i\}$ is qualified to receive a reward. If there is one $\Delta_{ix}^*$ which matches $\Delta_i$, the certification center 102 confirms that the signature $\Delta_i$ is a valid certificate and the user who owns $\Delta_i$ can obtain a reward for the sensed data $S_i$ that he/she previously provided to the application server 101.

In another embodiment, the certification center 102 calculates $\Delta_{ix}^*$ based upon the unique value $h(m_i)$ using a second algorithm. In a further embodiment, the certification center 102 calculates $\Delta_{ix}^*$ based upon the unique value $h(m_i)$ and a grade of the sensed data using a second algorithm. In a further embodiment, the certification center 102 calculates $\Delta_{ix}^*$ based upon the unique value $h(m_i)$, a grade of the sensed data, and the received timestamp $T_i$ using a second algorithm. The certification center 102 compares the calculated $\Delta_{ix}^*$ with the received $\Delta_i$. If there is one $\Delta_{ix}^*$ which matches $\Delta_i$, the certification center 102 confirms that the signature $\Delta_i$ is a valid certificate and the user who owns $\Delta_i$ can obtain a reward for the sensed data $S_i$ that he/she previously provided to the application server 101.

In some other examples, the pseudonym $m_i$ itself may contain timestamp information, and thus it may be unnecessary to either transmit a separate timestamp $T_i$ or use the timestamp $T_i$ in certificate $\Delta_i$ calculating/comparing.

Figure 2:
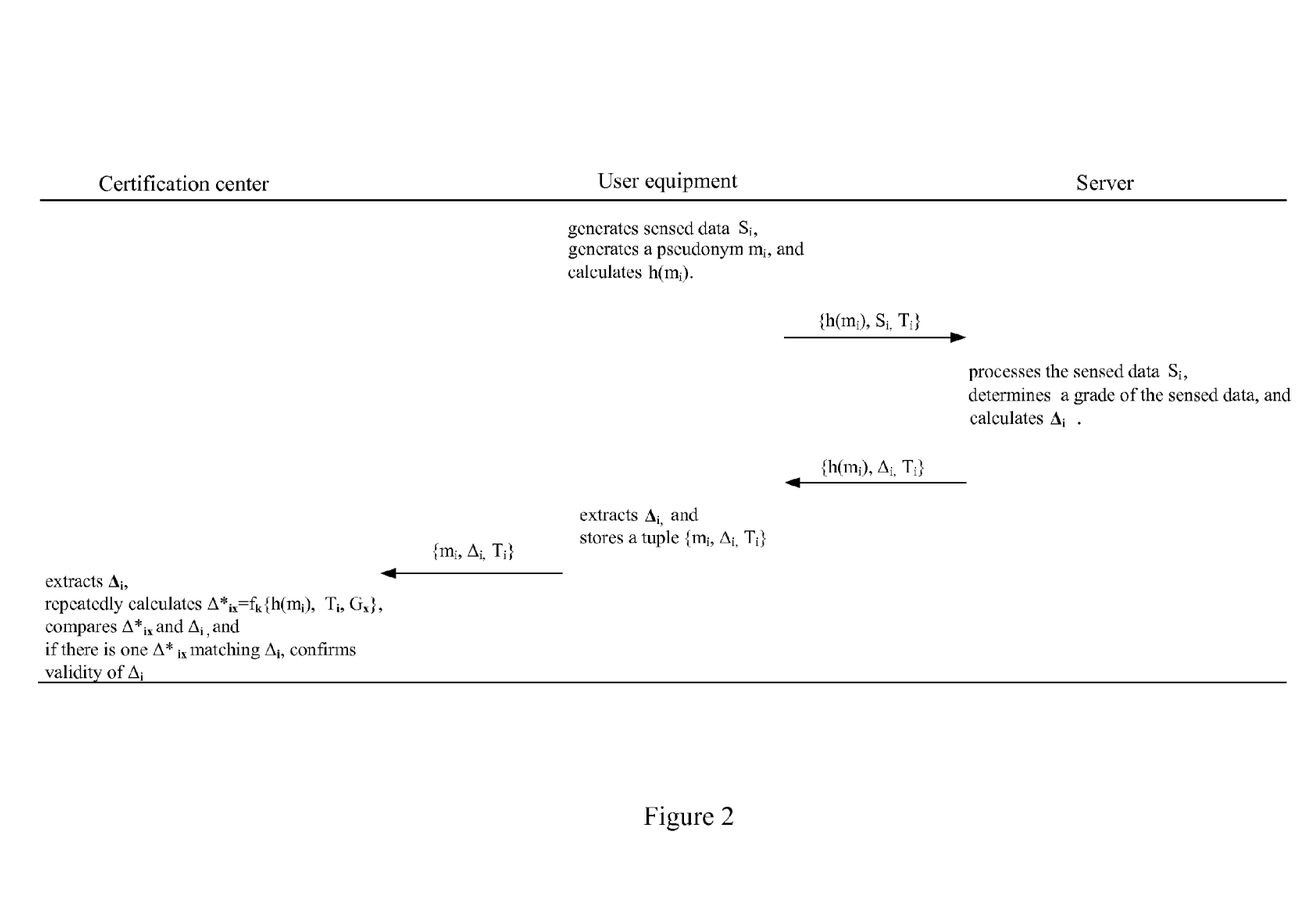
FIG. 2 illustrates interaction between a user equipment and a server (or an application server), and a certification center according to an example embodiment of the present invention.

FIG. 2 illustrates interaction between a user equipment and a server (or an application server), and a certification center according to an example embodiment of the present invention. In FIG. 2, it is assumed that the system initiation has been completed; thus, the user equipment has knowledge of the suitable hash function $h(\bullet)$ and the predefined data format, and the certification center has knowledge of the encryption function $f_k(\bullet)$, the hash function $h(\bullet)$, and the server's master key k, as well as the set of grades of the sensed data.

First, on the user side, the user launches a corresponding sensor program embedded in the UE 103 to generate sensed data $S_i$. Then, when the user needs to send the sensed data $S_i$ to the server, he/she operates the UE 103 to generate a pseudonym $m_i$ and calculate a hash conversion value $h(m_i)$. Subsequently, the user sends a message in the predefined format, which comprises $h(m_i)$, $S_i$ and a timestamp $T_i$, to the server. On the server side, upon receiving this message from the user, the server processes the sensed data $S_i$ and calculates a signature through, for example, $\Delta_i f_k(h(m_i),T_i,G_i)$, and then sends a message which may comprise $h(m_i)$, $\Delta_i$ and $T_i$ to the user. Now back to the user side, the user operates the UE 103 to extract $\Delta_i$ from the received message, generate a tuple $\{m_i,\Delta_i,T_i\}$ and store the tuple in the UE 103. Later, when the user wishes to obtain a reward, he/she sends a message $\{m_i,\Delta_i,T_i\}$ that comprises the pseudonym $m_i$, the signature $\Delta_i$ and the timestamp $T_i$ to the certification center via a secure channel. Upon receiving the message $\{m_i,\Delta_i,T_i\}$, the certification center extracts the signature $\Delta_i$, and then calculates $\Delta_{ix}^*=f_k(h(m_i),T_i,G_x)$ using each $G_x\in\{G_1, G_2, \ldots, G_R\}$. Next, the certification center compares $\Delta_{ix}^*$ with $\Delta_i$ so as to determine whether the user with the message $\{m_i,\Delta_i,T_i\}$ is qualified to receive a reward. If there is one $\Delta_i^*$ which matches $\Delta_i$, the user can be successfully authenticated. On the contrary, if none of $\Delta_{ix}^*$ matches $\Delta_i$, the certification center may reject this process.

Since the user sends to the certification center the message $\{m_i,\Delta_i,T_i\}$ via a secure channel, the adversary cannot impersonate the user. Meanwhile, the user's pseudonym appears in the common channel in the form of a hash conversion value $h(m_i)$. Therefore, the adversary cannot extract the user's original pseudonym $m_i$. Without the pseudonym, the adversary cannot be authenticated by the certification center.

Figure 3A:
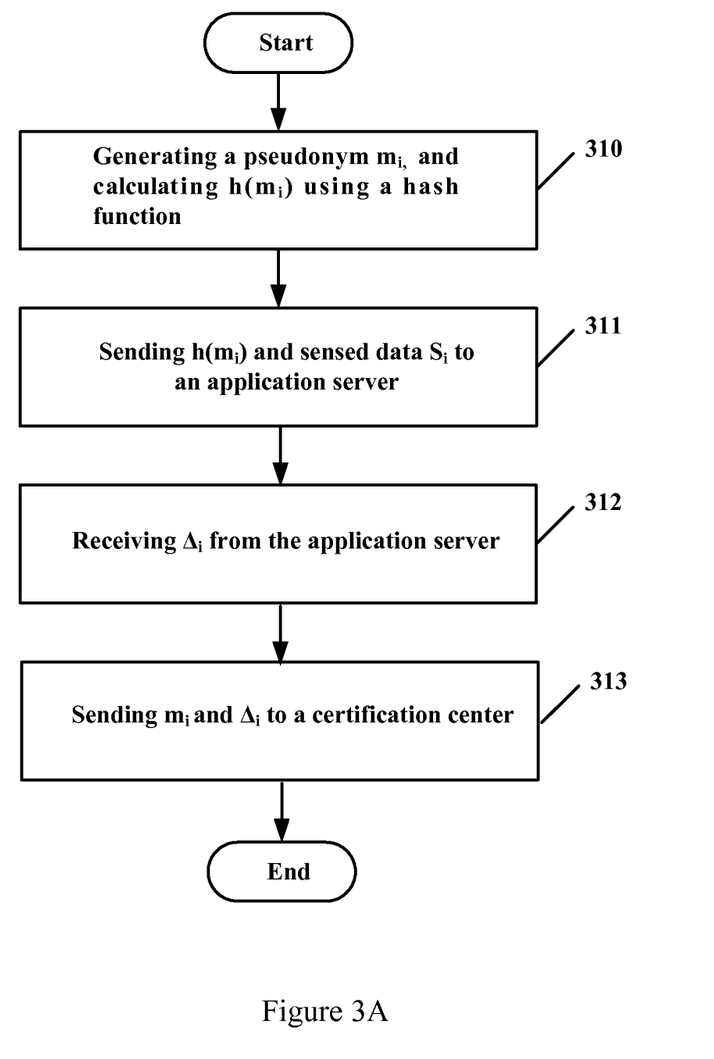
FIGS. 3A and 3B show a flowchart illustrating method steps performed on the user equipment to obtain a reward, according to an example embodiment of the present invention.
Figure 3B:
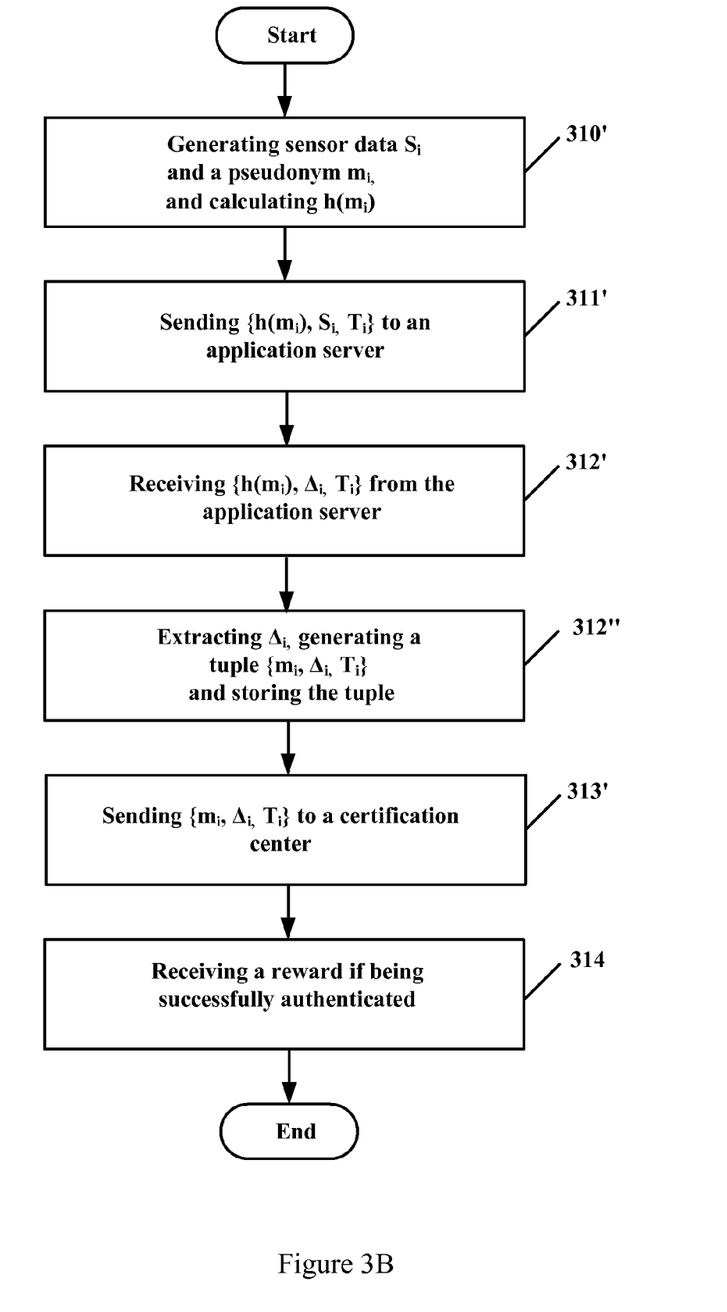

FIGS. 3A and 3B show flowcharts illustrating method steps performed on the user equipment 103, according to an example embodiment of the present invention. FIG. 3A is a simplified flowchart from FIG. 3B. In both figures, reference numbers refer to corresponding steps. As illustrated in FIG. 3A, first, in block 310, the user equipment 103 generates a pseudonym $m_i$ and calculates a hash conversion value $h(m_i)$ of the pseudonym. Then in block 311, the user equipment 103 sends the hash conversion value $h(m_i)$, and sensed data $S_i$ to an application server 101. Next, in block 312 the user equipment 103 receives a signature $\Delta_i$ from the server. Thereafter in block 313, the user equipment 103 sends the pseudonym $m_i$ and the signature $\Delta_i$ to a certification center 102 via a secure channel.

More detailed operations are illustrated in FIG. 3B. First, in block 310', the user equipment 103 generates sensed data $S_i$, a pseudonym $m_i$ and calculates a hash conversion value $h(m_i)$ of the pseudonym. Then in block 311', the user equipment 103 sends a message in a predefined format, which includes the hash conversion value $h(m_i)$, the sensed data $S_i$ and a timestamp $T_i$, to an application server 101. Next, upon receiving a message comprising $h(m_i)$, $T_i$ and a signature $\Delta_i$ from the server in block 312', the user equipment 103 extracts $\Delta_i$ from the received message, generates a tuple $\{m_i,\Delta_i,T_i\}$ and stores the tuple locally in block 312". Subsequently in block 313', the user equipment 103 sends a message comprising $m_i$, $\Delta_i$ and $T_i$ to a certification center 102 via a secure channel. Thereafter, once the user equipment 103 is successfully authenticated, it can receive a reward from the certification center 102 or from the application server 101 in block 314.

Figure 4:
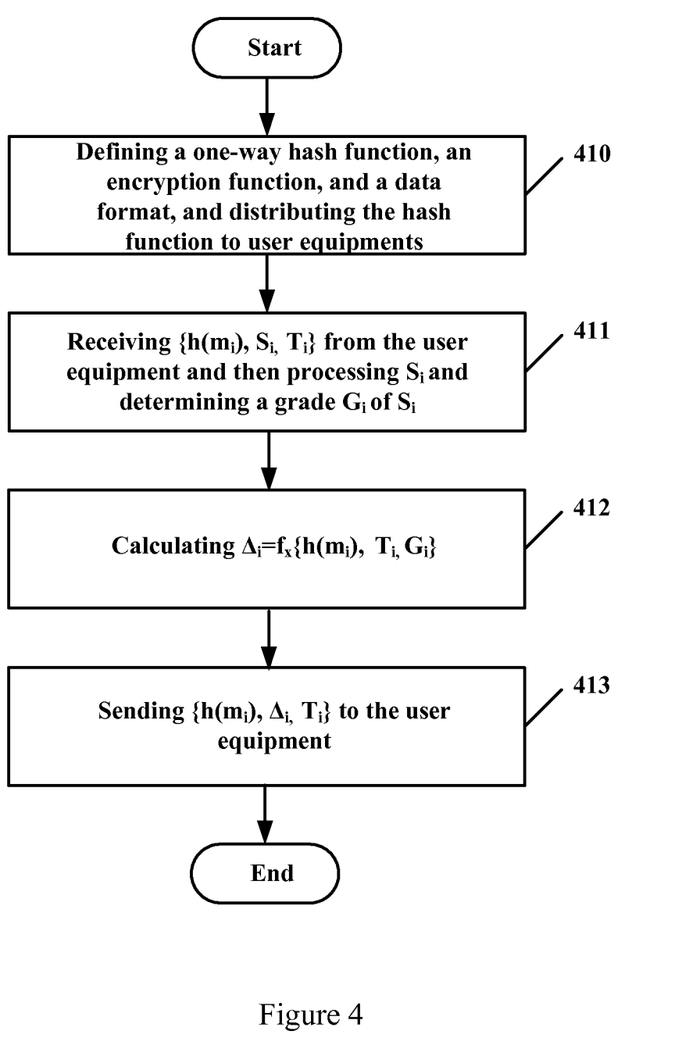
FIG. 4 shows a flowchart illustrating method steps performed on the application server according to an example embodiment of the present invention.

FIG. 4 shows a flowchart illustrating method steps performed on the application server 101 according to an example embodiment of the present invention. First in block 410, the application server 101 defines a suitable one-way hash function h(•), an encryption function $f_k$(•) and a data format, and distributes or notifies the hash function to user equipment(s) 103. Then in block 411, the application server 101 receives a message from the user equipment 103, which comprises a hash conversion value h($m_i$), sensed data $S_i$ and a timestamp $T_i$. Next, the application server 101 processes the sensed data and determines the grade of the sensed data, and then calculates a signature through $\Delta_i = f_k(h(m_i), T_i, G_i)$ in block 412. Thereafter, in block 413, the application server sends a message comprising h($m_i$), $\Delta_i$ and $T_i$ to the user equipment 103.

Figure 5:
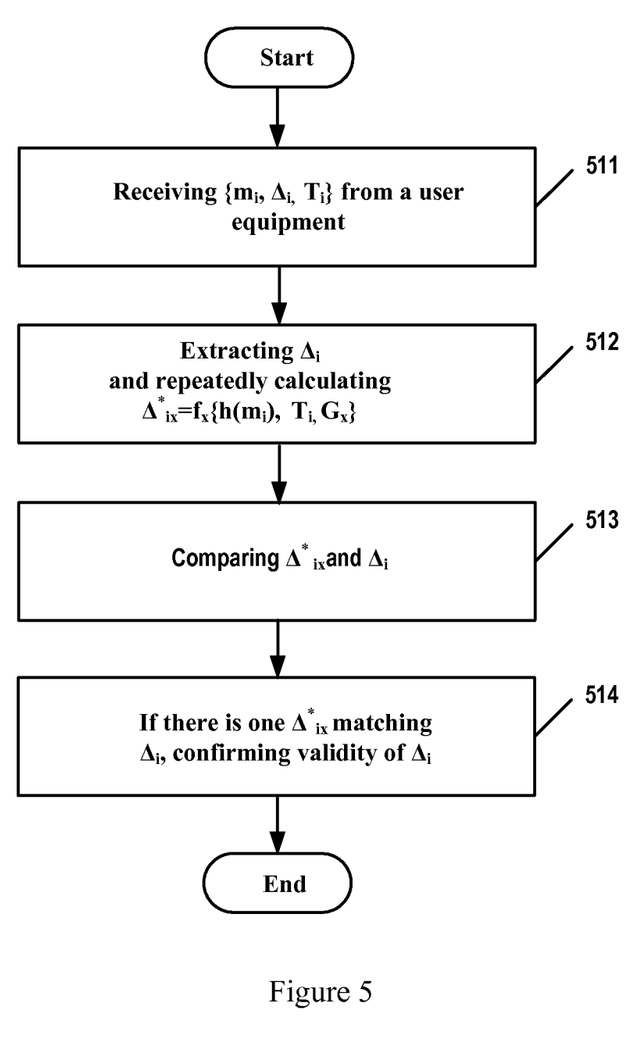
FIG. 5 shows a flowchart illustrating method steps performed on the certification center according to an example embodiment of the present invention.

FIG. 5 shows a flowchart illustrating method steps performed on the certification center 102 according to an example embodiment of the present invention. The certification center 102 receives a message comprising $m_i$, $\Delta_i$ and $T_i$ from a user equipment 103 in block 510. Then the certification center 102 extracts the signature $\Delta_i$, and calculates $\Delta_i^* = f_k(h(m_i), T_i, G_x)$ using each $G_x \in \{G_1, G_2, \ldots, G_R\}$ in block 511. Next, the certification center compares $\Delta_{ix}^*$ with $\Delta_i$ so as to determine whether the user with the message $\{m_i, \Delta_i, T_i\}$ is qualified to receive a reward. If there is one $\Delta_{ix}^*$ which matches $\Delta_i$, the user can be successfully authenticated and certify the user equipment. On the contrary, if none of $\Delta_{ix}^*$ matches $\Delta_i$, the certification center may reject this process.

As described previously, in some other examples, if the pseudonym $m_i$ itself contains timestamp information, then it may be unnecessary to use additional timestamp information such as a separate timestamp; accordingly, there will be no need to transmit a separate timestamp $T_i$ and/or use the timestamp $T_i$ in certificate $\Delta_i$ calculating/comparing.

Figure 6:
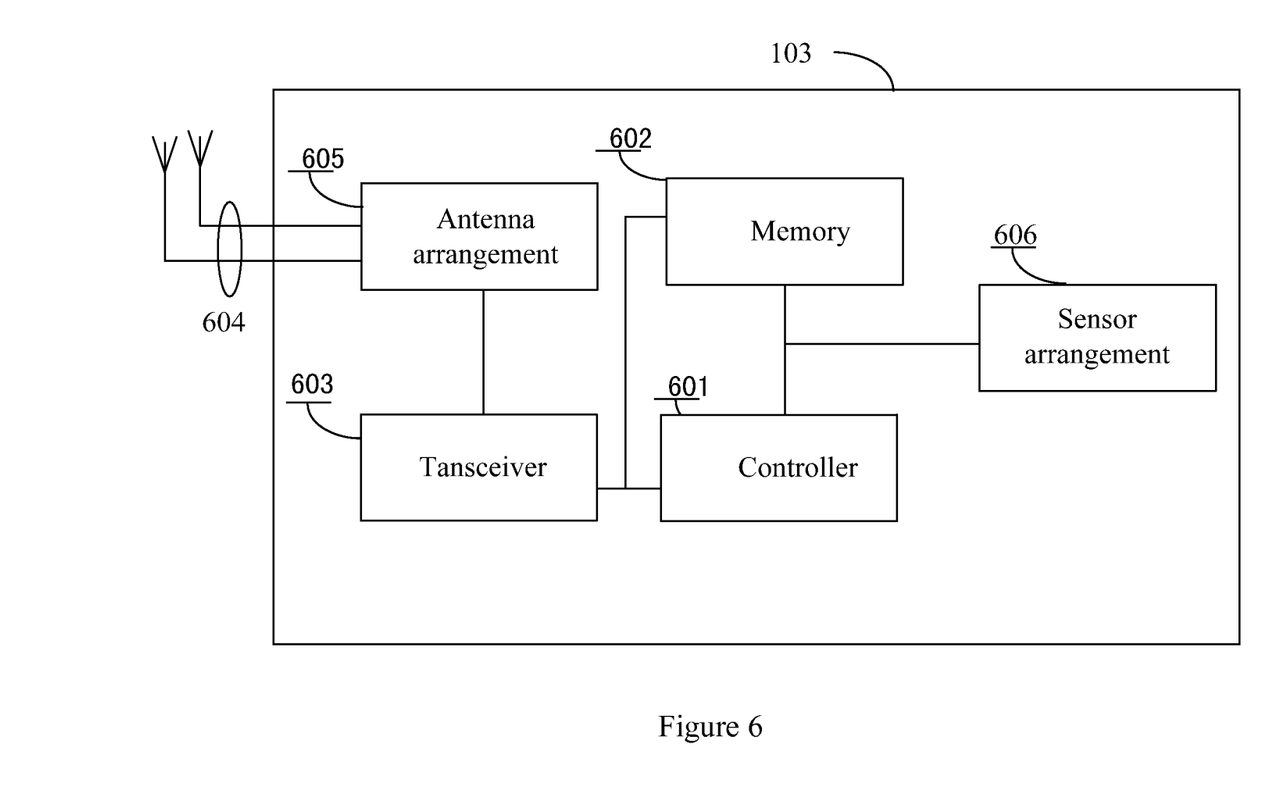
FIG. 6 shows a schematic structure of the user equipment according to an example embodiment of the present invention.

FIG. 6 shows a schematic structure of the user equipment 103 according to an example embodiment of the present invention, on which the methods as illustrated in FIG. 3A or 3B may be performed. The user equipment or UE 103 comprises a controller 601 operationally connected to a memory 602 and a transceiver 603. The controller 601 controls the operation of the user equipment 103. The memory 602 is configured to store program codes or instructions and data required for implementing the method according to the present invention. The transceiver 603 is operationally connected to a set of antenna ports 604 connected to an antenna arrangement 605, and is configured to set up and maintain a wireless connection to other network nodes, such as base stations. The user equipment 103 also comprises a sensor arrangement 606, which is operationally connected to the memory 602 and the controller 601 and may obtain sensed data in embodiments of the present invention. The sensor arrangement 606 may comprise at least one sensor, which is for example but not limited to a temperature sensor, a humidity sensor, a motion sensor, a GPS receiver and a camera or the like. In one embodiment, the sensed data comprise one or more of a sensed temperature, a sensed humidity, a sensed motion, a sensed coordinate (longitude, latitude, elevation, etc.), a sensed image, and so on. The user equipment 103 may also comprise various other components, such as a user interface, and media player, which are not shown in FIG. 6 due to simplicity purposes.

Figure 7:
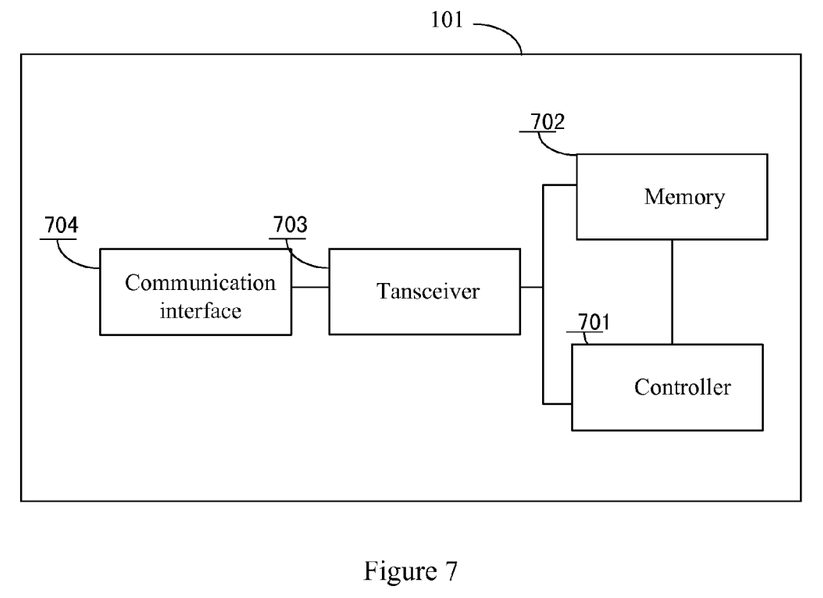
FIG. 7 shows a schematic structure of the server according to an example embodiment of the present invention.

FIG. 7 shows a schematic structure of the server according to an example embodiment of the present invention, on which the method as illustrated in FIG. 4 may be performed. The server, such as the application server 101, comprises a controller 701 operationally connected to a memory 702, and a transceiver 703. The controller 701 controls the operation of the server. The memory 702 is configured to store program codes or instructions and data required for implementing the method according to the present invention. The transceiver 703 is operationally connected to a communication interface 704 and is configured to set up and maintain a connection to other network nodes, such as base stations through the communication interface 704.

Figure 8:
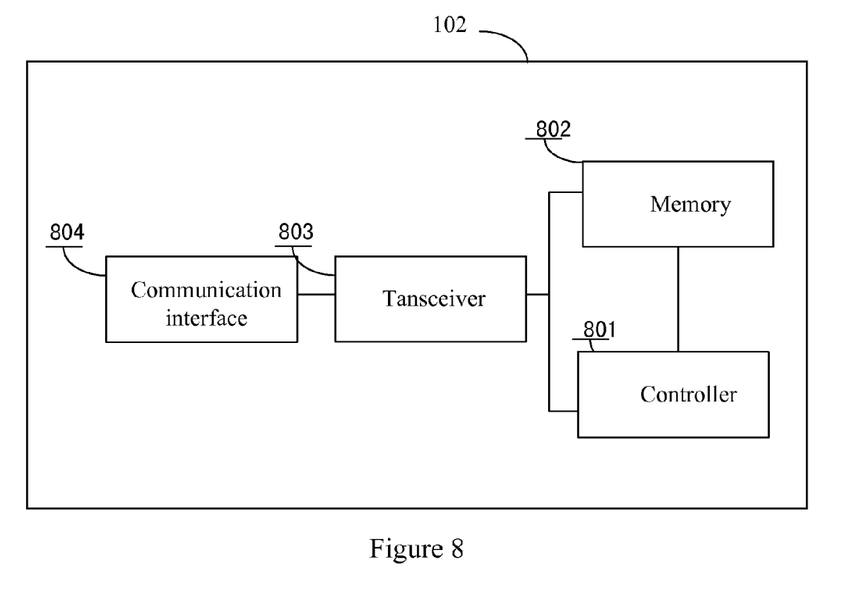
FIG. 8 shows a schematic structure of the certification center according to an example embodiment of the present invention.

FIG. 8 shows a schematic structure of the certification center 102 according to an example embodiment of the present invention, on which the method as illustrated in FIG. 5 may be performed. The certification center 102 comprises a controller 801 operationally connected to a memory 802, and a transceiver 803. The controller 801 controls the operation of the certification center. The memory 802 is configured to store program codes or instructions and data required for implementing the method according to the present invention. The transceiver 803 is operationally connected to a communication interface 804 and is configured to set up and maintain a connection to other network nodes, such as base stations through the communication interface 804.

Thus, according to one embodiment of the present invention, there is provided a method for generating a pseudonym in association with sensed data at a user equipment; calculating a unique value based upon the pseudonym using a first algorithm; sending the unique value and the sensed data to a server; receiving from the server a certificate, which is calculated based at least in part on the unique value using a second algorithm; and sending at least the pseudonym and the certificate to a certification center via a secure channel, for obtaining a reward associated with the sensed data, wherein the certification center is internal or external to the server.

According to another embodiment of the present invention, the first algorithm comprises a hash function.

According to yet another embodiment of the present invention, the second algorithm comprises an encryption function.

According to yet another embodiment of the present invention, the method comprises receiving from the server information associated with the first algorithm prior to calculating the unique value.

According to yet another embodiment of the present invention, the certificate is calculated at the server using the second algorithm based upon the unique value and at least one of a grade of the sensed data and a timestamp associated with the sensed data.

According to yet another embodiment of the present invention, the method comprises saving in the user equipment at least the pseudonym, the certificate, and a timestamp associated with the sensed data prior to sending at least the pseudonym and the certificate.

According to yet another embodiment of the present invention, the certification center is aware of the first algorithm and the second algorithm.

According to yet another embodiment of the present invention, there is provided a computer program product, comprising program code instructions adapted to perform steps of any method as described above when the program is run on a computer.

According to yet another embodiment of the present invention, there is provided a method for receiving, at a server, a unique value and sensed data from a user equipment, wherein the unique value is calculated at the user equipment using a first algorithm based upon a pseudonym generated by the user equipment; calculating a certificate based at least in part on the unique value using a second algorithm; and sending the certificate to the user equipment so that the certificate may be forwarded to a certification center for obtaining a reward associated with the sensed data, wherein the certification center is internal or external to the server.

According to yet another embodiment of the present invention, the method comprises determining a first algorithm and sending information associated with the first algorithm to the user equipment prior to receiving the unique value and the sensed data.

According to yet another embodiment of the present invention, the first algorithm comprises a hash function.

According to yet another embodiment of the present invention, the second algorithm comprises an encryption function.

According to yet another embodiment of the present invention, the method comprises determining a grade of the sensed data prior to calculating the certificate.

According to yet another embodiment of the present invention, the method comprises calculating the certificate using the second algorithm based upon the unique value and at least one of the grade of the sensed data and a timestamp associated with the sensed data.

According to yet another embodiment of the present invention, the method comprises defining a data format prior to receiving the unique value and the sensed data.

According to yet another embodiment of the present invention, the user equipment is aware of the data format.

According to yet another embodiment of the present invention, there is provided a computer program product, comprising program code instructions adapted to perform steps of any method as described above when the program is run on a computer.

According to yet another embodiment of the present invention, there is provided a method for receiving, at a certification center, at least a pseudonym and a certificate via a secure channel from a user equipment; calculating a unique value using a first algorithm based upon the pseudonym; calculating at least one reference value based at least in part on the unique value using a second algorithm; comparing the at least reference value with the received certificate; and if the at least one reference value matches the received certificate, confirming validity of the received certificate so that the user equipment may obtain a reward associated sensed data; wherein the certification center is internal or external to a server.

According to yet another embodiment of the present invention, the first algorithm comprises a hash function determined by the server.

According to yet another embodiment of the present invention, the second algorithm comprises an encryption function determined by the server.

According to yet another embodiment of the present invention, calculating the at least one reference value comprises calculating a reference value based upon the unique value and at least one of a timestamp associated with the sensed data and one of a plurality of data grades, the plurality of data grades being predefined by the server.

According to yet another embodiment of the present invention, there is provided a computer program product, comprising program code instructions adapted to perform steps of any method as described above when the program is run on a computer.

According to yet another embodiment of the present invention, there is provided an apparatus comprising a sensor arrangement comprising at least one sensor for sensing data; at least one processor; and at least one memory including a computer program code, wherein the at least one memory and the computer program code are configured to, with the at least one processor, cause the apparatus to: generate a pseudonym in association with sensed data; calculate a unique value based upon the pseudonym using a first algorithm; send the unique value and the sensed data to a server; receive from the server a certificate, wherein the certificate is calculated at the server based at least in part on the unique value using a second algorithm; and send at least the pseudonym and the certificate to a certification center via a secure channel, for obtaining a reward associated with the sensed data, wherein the certification center is internal or external to the server.

According to yet another embodiment of the present invention, the first algorithm comprises a hash function.

According to yet another embodiment of the present invention, the second algorithm comprises an encryption function.

According to yet another embodiment of the present invention, the at least one memory and the computer program code are further configured to, with the at least one processor, cause the apparatus to receive from the server information associated with the first algorithm prior to calculating the unique value.

According to yet another embodiment of the present invention, the at least one memory and the computer program code are further configured to, with the at least one processor, cause the apparatus to save at least the pseudonym, the certificate, and a timestamp associated with the sensed data prior to sending at least the pseudonym and the certificate.

According to yet another embodiment of the present invention, there is provided an apparatus comprising at least one processor; and at least one memory including a computer program code, wherein the at least one memory and the computer program code are configured to, with the at least one processor, cause the apparatus to: receive a unique value and sensed data from a user equipment, wherein the unique value is calculated at the user equipment using a first algorithm based upon a pseudonym generated by the user equipment; calculate a certificate based at least in part on the unique value using a second algorithm; and send the certificate to the user equipment so that the certificate may be forwarded to a certification center for obtaining a reward associated with the sensed data, wherein the certification center is internal or external to the apparatus.

According to yet another embodiment of the present invention, the at least one memory and the computer program code are further configured to, with the at least one processor, cause the apparatus to determine a first algorithm and send information associated with the first algorithm to the user equipment prior to receiving the unique value.

According to yet another embodiment of the present invention, the first algorithm comprises a hash function.

According to yet another embodiment of the present invention, the second algorithm comprises an encryption function.

According to yet another embodiment of the present invention, the at least one memory and the computer program code are further configured to, with the at least one processor, cause the apparatus to determine a grade of the sensed data prior to calculating the certificate.

According to yet another embodiment of the present invention, the at least one memory and the computer program code are further configured to, with the at least one processor, cause the apparatus to calculate the certificate using the second algorithm based upon the unique value and at least one of the grade of the sensed data and a timestamp associated with the sensed data.

According to yet another embodiment of the present invention, the at least one memory and the computer program code are further configured to, with the at least one processor, cause the apparatus to: define a data format prior to receiving the unique value and the sensed data.

According to yet another embodiment of the present invention, there is provided an apparatus comprising at least one processor; and at least one memory including a computer program code, wherein the at least one memory and the computer program code are configured to, with the at least one processor, cause the apparatus to: receive at least a pseudonym and a certificate via a secure channel from a user equipment; calculate a unique value using a first algorithm based upon the pseudonym; calculate at least one reference value based at least in part on the unique value using a second algorithm; compare the at least one reference value with the received certificate; and if the at least one reference value matches the received certificate, confirm validity of the received certificate so that the user equipment may obtain a reward associated with sensed data; wherein the apparatus is internal or external to a server.

According to yet another embodiment of the present invention, the first algorithm comprises a hash function determined by the server.

According to yet another embodiment of the present invention, the second algorithm comprises an encryption function determined by the server.

According to yet another embodiment of the present invention, the at least one memory and the computer program code are further configured to, with the at least one processor, cause the apparatus to: calculate a reference value based upon the unique value and at least one of a timestamp associated with the sensed data and one of a plurality of data grades, the plurality of data grades being predefined by the server.

Example embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

What is claimed is:

1. A user equipment, comprising:
a sensor arrangement comprising at least one sensor for sensing data associated with an environment surrounding the user equipment, the sensed data having at least one attribute;
at least one processor; and
at least one memory including a computer program code, wherein the at least one memory and the computer program code are configured to, with the at least one processor, cause the user equipment to at least:
generate a pseudonym in association with sensed data;
calculate a unique value based upon the pseudonym using a first algorithm;
generate an electronic communication data structure comprising the unique value and the sensed data;
send the electronic communication data structure to a server;
receive from the server, in response to the server receiving the electronic communication data structure, an electronic certificate, wherein the electronic certificate is calculated at the server, based at least in part on the unique value and the at least one attribute of the sensed data, using a second algorithm; and
send, from the user equipment to the certification center via a secure channel, an electronic communication data structure comprising at least the pseudonym and the certificate;
receive, from the certification center, at the user equipment, an electronic communication data structure comprising an electronic reward associated with the sensed data, the electronic reward generated by the certification center based on the unique value generated by the user equipment and the certificate calculated at the server;
wherein the certification center is internal or external to the server.

2. The user equipment according to claim 1, wherein the first algorithm comprises a hash function.

3. The user equipment according to claim 1, wherein the second algorithm comprises an encryption function.

4. The user equipment according to claim 1, wherein the user equipment is further configured to at least: prior to calculating the unique value, receive from the server information associated with the first algorithm.

5. The user equipment according to claim 1, wherein the user equipment is further configured to at least: prior to sending at least the pseudonym and the certificate, save at least the pseudonym, the certificate, and a timestamp associated with the sensed data.

6. An apparatus, comprising:
at least one processor; and
at least one memory including a computer program code, wherein the at least one memory and the computer program code are configured to, with the at least one processor, cause the apparatus to at least:
receive, from a user equipment and in an electronic communication data structure, a unique value and sensed data from the user equipment, the sensed data associated with an environment surrounding the user equipment, the sensed data having at least one attribute and the unique value calculated at the user equipment using a first algorithm based upon a pseudonym generated by the user equipment, the pseudonym associated with the sensed data;
calculate an electronic certificate, based at least in part on the unique value and the at least one attribute of the sensed data, using a second algorithm; and send the certificate, in an electronic communication data structure, to the user equipment so that the certificate may be forwarded to a certification center by the user equipment, in an electronic communication data structure and via a secure channel, for obtaining a reward associated with the sensed data, the reward generated by a certification center based on the unique value generated by the user equipment and the certificate;

wherein the certification center is internal or external to the apparatus.

7. The apparatus according to claim 6, wherein the apparatus is further configured to at least: prior to receiving the unique value, determine a first algorithm and send information associated with the first algorithm to the user equipment.

8. The apparatus according to claim 6, wherein the first algorithm comprises a hash function.

9. The apparatus according to claim 6, wherein the second algorithm comprises an encryption function.

10. The apparatus according to claim 6, wherein the apparatus is further configured to at least: prior to calculating the certificate, determine a grade of the sensed data.

11. The apparatus according to claim 6, wherein the apparatus is further configured to at least: calculate the certificate using the second algorithm based upon the unique value and at least one of the grade of the sensed data and a timestamp associated with the sensed data.

12. The apparatus according to claim 6, wherein the at least one memory and the computer program code are further configured to, with the at least one processor, cause the apparatus to: prior to receiving the unique value and the sensed data, define a data format.

13. An apparatus, comprising:
at least one processor; and
at least one memory including a computer program code, wherein the at least one memory and the computer program code are configured to, with the at least one processor, cause the apparatus to at least:
receive, from a user equipment, an electronic communication data structure, including at least a pseudonym and a certificate, and via a secure channel, the pseudonym generated by the user equipment and associated with sensed data obtained by the user equipment;
calculate a unique value using a first algorithm based upon the pseudonym;
calculate at least one reference value based at least in part on the unique value using a second algorithm;
compare the at least one reference value with the received certificate; and
if the at least one reference value matches the received certificate, confirm validity of the received certificate so that the user equipment may obtain an electronic reward associated with sensed data, the electronic reward based on the unique value generated by the user equipment and the certificate;
wherein the apparatus is internal or external to a server.

14. The apparatus according to claim 13, wherein the first algorithm comprises a hash function determined by the server.

15. The apparatus according to claim 13, wherein the second algorithm comprises an encryption function determined by the server.

16. The apparatus according to claim 13, the apparatus further configured to at least: calculate a reference value based upon the unique value and at least one of a timestamp associated with the sensed data and one of a plurality of data grades, the plurality of data grades being predefined by the server.

* * * * *